United States Patent
Muralikrishnan Vathsala et al.

(10) Patent No.: US 12,277,519 B2
(45) Date of Patent: Apr. 15, 2025

(54) SYSTEMS AND METHODS FOR MAINTAINING KEY PERFORMANCE INDICATOR TARGETS OF A CONTACT CENTER

(71) Applicant: Verizon Patent and Licensing Inc., Basking Ridge, NJ (US)

(72) Inventors: Prabhuram Muralikrishnan Vathsala, Chennai (IN); Aiswarya Venkatachalapathy, Chennai (IN); Balakrishnan Palanisamy, Namakkal (IN); Prashanth Sanjeevi, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 190 days.

(21) Appl. No.: 17/872,446

(22) Filed: Jul. 25, 2022

(65) Prior Publication Data

US 2024/0028999 A1    Jan. 25, 2024

(51) Int. Cl.
*G06Q 10/0637*    (2023.01)
*G06Q 10/0639*    (2023.01)
*H04M 3/51*       (2006.01)

(52) U.S. Cl.
CPC . *G06Q 10/06375* (2013.01); *G06Q 10/06393* (2013.01); *H04M 3/5175* (2013.01); *H04M 2203/401* (2013.01)

(58) Field of Classification Search
CPC .................. G06Q 10/06375; G06Q 10/06393
See application file for complete search history.

(56) References Cited

U.S. PATENT DOCUMENTS

| | | | | |
|---|---|---|---|---|
| 8,209,218 B1 * | 6/2012 | Basu | ............... | G06Q 10/0637 |
| | | | | 705/7.38 |
| 8,364,519 B1 * | 1/2013 | Basu | ............... | G06Q 10/06393 |
| | | | | 705/7.38 |
| 11,087,261 B1 * | 8/2021 | Basu | ............... | G06Q 10/0639 |

(Continued)

OTHER PUBLICATIONS

Diaz-Aviles, Ernesto, et al. "Towards real-time customer experience prediction for telecommunication operators." 2015 IEEE International Conference on Big Data (Big Data). IEEE, 2015. (Year: 2015).*

(Continued)

*Primary Examiner* — Andre D Boyce (57) ABSTRACT

In some implementations, a device may provide, as input to a model, input data indicating current value(s) corresponding to key performance indicator(s) (KPI) associated with current calls to a contact center, enterprise event(s), and stability event(s) associated with the contact center. The device may receive, as an output from the machine learning model, predicted value(s) corresponding to the KPI(s). The device may determine predicted rate(s) of change of the KPI(s) based on a comparison of the current and predicted value(s). The device may assign severity level(s) corresponding to the KPI(s) based on the predicted rate(s) of change. The device may determine a service level impact based on the predicted value(s). The device may determine a performance degradation score based on the severity level(s) and the service level impact. The device may determine and automatically apply a strategy based on the performance degradation score.

20 Claims, 8 Drawing Sheets

(56) References Cited

U.S. PATENT DOCUMENTS

| | | | |
|---|---|---|---|
| 11,778,099 B2* | 10/2023 | Munoz | H04M 3/5238 |
| | | | 379/265.06 |
| 2007/0198323 A1* | 8/2007 | Bourne | G06Q 10/0639 |
| | | | 705/7.41 |
| 2007/0206768 A1* | 9/2007 | Bourne | G06Q 10/063112 |
| | | | 379/265.01 |
| 2010/0274637 A1* | 10/2010 | Li | G06Q 10/06 |
| | | | 379/265.06 |
| 2014/0376710 A1* | 12/2014 | Shaffer | H04M 3/5175 |
| | | | 379/265.06 |
| 2015/0181038 A1* | 6/2015 | Fox | H04M 3/5175 |
| | | | 379/265.06 |
| 2015/0195405 A1* | 7/2015 | McCormack | H04M 3/5175 |
| | | | 379/265.06 |
| 2016/0086125 A1* | 3/2016 | Hanrahan | G06Q 10/06398 |
| | | | 705/7.42 |
| 2016/0112568 A1* | 4/2016 | Nowak | G06Q 10/06393 |
| | | | 379/265.09 |
| 2016/0295019 A1* | 10/2016 | O'Connor | H04M 3/5175 |
| 2016/0373950 A1* | 12/2016 | Niemoeller | H04L 67/61 |
| 2018/0034966 A1* | 2/2018 | te Booij | H04M 3/5232 |
| 2022/0027837 A1* | 1/2022 | D'Attilio | H04M 3/5175 |
| 2022/0360669 A1* | 11/2022 | Munoz | H04M 3/5238 |

OTHER PUBLICATIONS

Ahmed, A., Hifny, Y., Toral, S., & Shaalan, K. (2018). A call center agent productivity modeling using discriminative approaches. Intelligent Natural Language Processing: Trends and Applications, 501-520. (Year: 2018).*

* cited by examiner

SYSTEMS AND METHODS FOR MAINTAINING KEY PERFORMANCE INDICATOR TARGETS OF A CONTACT CENTER

BACKGROUND

A contact center (e.g., a call center and/or the like) is a centralized office used for receiving large volumes of inquiries via telephone, chat, and/or another form of communication. A contact center is often operated by a company to administer technical support relating to a product and/or a service for consumers. In some cases, contact centers may utilize cloud-based software as a service (SaaS) platforms, and use application programming interfaces (APIs) to integrate with cloud-based applications to interact with consumers. Developers use APIs to enhance cloud-based contact center platform functionality (e.g., using Computer Telephony Integration (CTI) APIs to provide basic telephony controls and sophisticated call handling, configuration APIs to enable Graphical User Interface (GUI) controls of administrative functions, and/or the like).

DETAILED DESCRIPTION OF EXAMPLE EMBODIMENTS

The following detailed description of example implementations refers to the accompanying drawings. The same reference numbers in different drawings may identify the same or similar elements.

A contact center (e.g., a call center) may receive thousands of calls in a particular day. A goal of the contact center is to maintain a target level of performance, which may be tracked via skill key performance indicator (KPI) targets (e.g., skill service level, call-in-rate, average speed of answer, abandon rate, number of agents staffed, and/or average handling time). On a day-to-day basis, the contact center (e.g., supervisors) monitors the skill KPIs in regular intervals or from previous days, and analyze the impact of the service level based on the skill KPIs. In some situations, the skill KPIs may deteriorate (e.g., decrease in performance). In response, the contact center may make reactive changes in the customer call path systems (e.g., Interactive Voice Response and/or Pre-Routing Experiences & Routing Strategies). However, by the time impact is determined and changes are applied, the skill KPIs have already deteriorated below the target level of performance. As a result, reversing the effect of the deterioration of the skill KPIs may take a long time to reverse or may not even be reversable. Additionally, the contact center may be included and/or flagged in a performance report due to the deteriorated performance. Accordingly, it is desirable for a system to predict any deterioration in the skill KPIs and implement a strategy to proactively address the predicted deterioration before it happens and/or before the contact center may be included in a performance report.

Some implementations herein provide a system that is capable of predicting future performance of the contact center. To do so, the system may compare current values of particular KPIs with predicted values of the particular KPIs for a future timeframe to determine rates of change associated with the particular KPIs. Based on the rates of change, the system may assign severity levels corresponding to the KPIs, from which the system may determine a performance degradation score associated with the contact center. Based on the performance degradation score, the system may determine and apply a strategy for the contact center to implement. Accordingly, the system is able to proactively determine a strategy ahead of any potential performance degradation of the contact center to address the potential performance degradation before it happens. As a result, the contact center is able to efficiently operate and utilize contact center resources (e.g., computing and/or telephonic resources) and time to maximize the number of calls the contact center may handle.

FIGS. 1A-1D are diagrams of an example 100 associated with maintaining key performance indicator targets of a contact center. As shown in FIGS. 1A-1D, example 100 includes a performance analysis system 105, one or more client devices 110, one or more contact center device(s) 115, and one or more network storage devices 120.

Figure 1A:
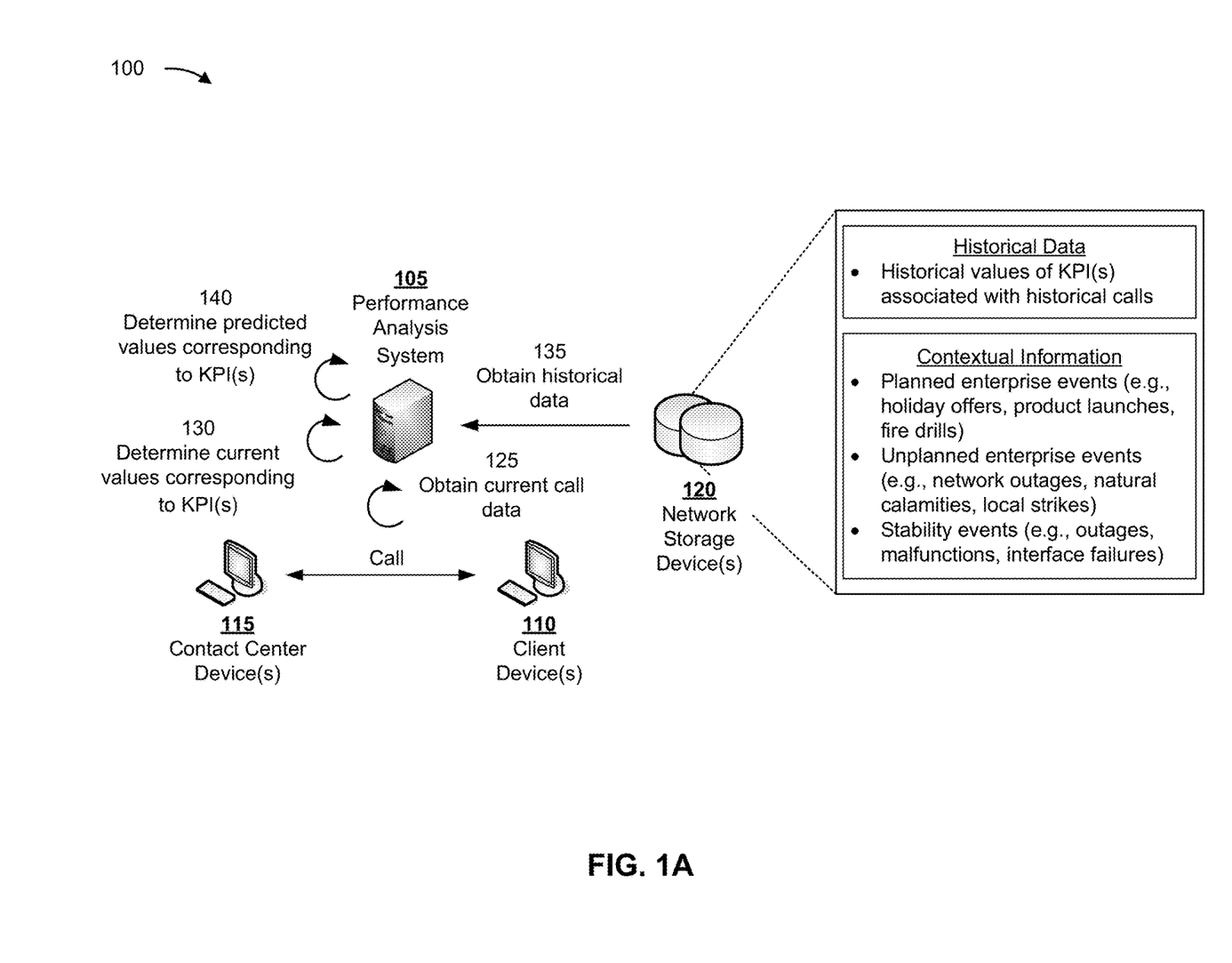
FIGS. 1A-1D are diagrams of an example associated with maintaining key performance indicator targets of a contact center.

As shown in FIG. 1A, a client may call or otherwise contact (e.g., via a client device 110) a contact center (e.g., via a contact center device 115) to obtain information and/or resolve an issue, for example, associated with an account of the client. Call data associated with the call may be stored in a network storage device 120. The call data may indicate call information such as a length of time before the call was answered, a length of time of the call, whether or not the call was abandoned prior to resolution of the client's question and/or issue, and/or the like.

As shown by reference number 125, the performance analysis system 105 may obtain current call data for a specific timeframe (e.g., the previous 15 minutes, 30 minutes, or 1 hour). For example, the performance analysis system 105 may obtain, from the network storage device 120, call data associated with calls that occurred within the specific timeframe. Additionally, or alternatively, the performance analysis system 105 may internally store and access (e.g., from a memory of the performance analysis system 105) call data associated with calls that occurred within the specific timeframe. The call data for a particular call may be removed from the memory once a call time associated with the particular call falls outside of the specific timeframe (e.g., in the 16th minute for a timeframe of 15 minutes).

As shown by reference number 130, based on the current call data, the performance analysis system 105 may determine current values corresponding to one or more key performance indicators (KPIs) associated with the contact center. Examples of KPIs may include skill service level, call-in-rate, average speed of answer, abandon rate, number of agents staffed, or average handling time. Some of the KPIs may depend on other KPIs. For example, the skill service level may depend on the call-in-rate, the average speed of answer, and/or the abandon rate. As an example, the skill service level may have a direct relationship with the call-in-rate, the average speed of answer, and/or the abandon rate (e.g., a value of the skill service level may increase with the call-in-rate, the average speed of answer, and/or the abandon rate). Additionally, or alternatively, the call-in-rate, the average speed of answer, and/or the abandon rate may depend on the number of agents staffed and/or the average handling time. For example, the call-in-rate, the average speed of answer, and/or the abandon rate may have an inverse relationship with the number of agents staffed (e.g., the call-in-rate, the average speed of answer, and/or the abandon rate may decrease as the number of agents staffed increases).

As an example of determining the current values corresponding to the KPIs, the performance analysis system 105 may determine the number of calls that occurred within the specific timeframe. From the number of calls, the performance analysis system 105 may determine a call-in-rate (e.g., the total number of calls divided by the timeframe). Additionally, or alternatively, the performance analysis system may determine an answer length of time (e.g., the time it took before each call was answered), and then determine an average speed of answer (e.g., total length of time to answer the calls divided by the total number of calls). Additionally, or alternatively, the performance analysis system 105 may determine a number of calls that were abandoned in the specific timeframe (e.g., calls identified as being abandoned and/or having a call length of time less than an abandonment time threshold), and then determine the abandonment rate (e.g., total number of abandoned calls divided by total number of calls).

As shown by reference number 135, the performance analysis system 105 may obtain historical data associated with the KPIs associated with historical calls to the contact center. For example, the performance analysis system 105 may obtain, from a network storage device 120 (which may be the same as or may be different from the network storage device 120 storing call data) historical values of KPIs associated with the contact center for a historical timeframe. The historical timeframe may be the same as, may overlap with, or may be different from the specific timeframe for which the current call data is obtained.

Additionally, or alternatively, the performance analysis system 105 may obtain, from the same or from a different network storage device 120, contextual information associated with the historical timeframe. The contextual information may include information associated with enterprise events (e.g., external events outside of the contact center that may affect the number of calls received by the contact center and/or the performance of the contact center). The enterprise events may be planned or unplanned. For example, planned enterprise events may include holiday offers associated with a particular product and/or service, new product launches, or events that affect agent availability (e.g., fire drills). Unplanned enterprise events may include network outages, natural calamities (e.g., fires or other natural disasters), or local strikes. Additionally, or alternatively, the contextual information may include stability events (e.g., internal events within the contact center that may affect the performance of the contact center). For example, the stability events may include contact center infrastructure outages, contact center peripheral outages, computer telephony interface outages, and/or other malfunctions or interface failures.

As shown by reference number 140, the performance analysis system 105 may determine predicted values corresponding to the one or more of the KPIs for a future timeframe (e.g., 15 minutes, 30 minutes, or 1 hour). The future timeframe may be the same as or may be different from the current timeframe. The performance analysis system 105 may determine the predicted values based on current values corresponding to the KPIs, any enterprise events, and/or any stability events. The performance analysis system 105 may obtain information (e.g., anticipated dates) associated with any planned enterprise events from a network storage device 120. Additionally, or alternatively, the performance analysis system 105 may predict an unplanned enterprise event based on other contextual data, such as a weather forecast. For example, if the weather forecast indicates a thunderstorm, precipitation above a precipitation threshold, and/or wind speeds above a wind threshold, then the performance analysis system may predict a network outage.

In some implementations, the performance analysis system 105 may determine the predicted values using a model. In some implementations, the model may be a machine learning model, as described in more detail below in connection with FIG. 2. The performance analysis system 105 may provide, as inputs to the model, the current values corresponding to the KPIs, any enterprise events, and/or any stability events. The performance analysis system 105 may receive the predicted values as an output from the model. The model may be based on historical data associated with the KPIs and associated with a plurality of historical calls to the contact center. In implementations in which the model is a machine learning model, the machine learning model may be trained using the historical data.

Figure 1B:
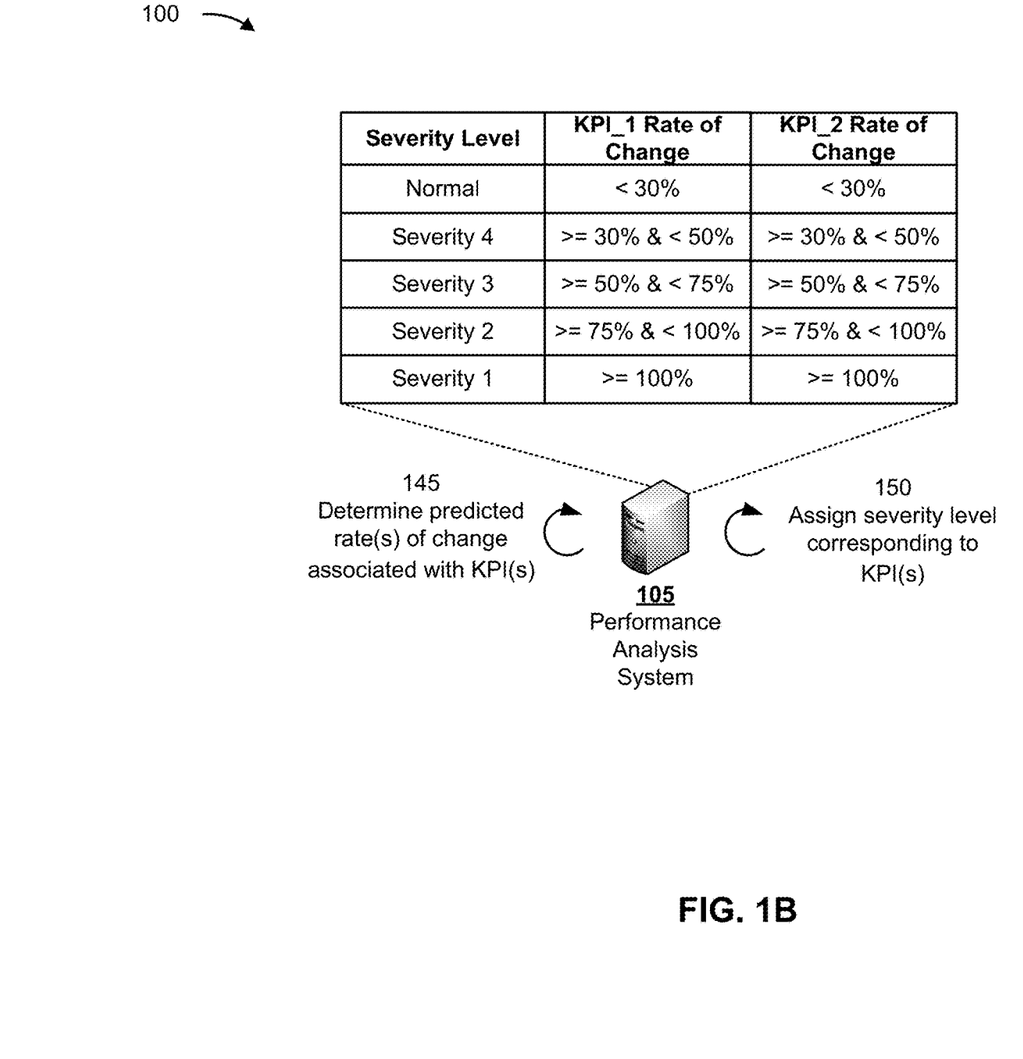

As shown in FIG. 1B, and by reference number 145, the performance analysis system 105 may determine predicted rates of change associated with the KPIs based on a comparison of the current values of the KPIs with the predicted values of the KPIs. For example, the performance analysis system 105 may determine the difference between the current value of a particular KPI and the future value of the particular KPI, and may divide the difference by the current value of the particular KPI to determine the predicted rate of change.

As shown by reference number 150, the performance analysis system 105 may assign severity levels corresponding to the KPIs based on the predicted rates of change. In some implementations, for a particular KPI, the performance analysis system 105 may assign the severity level based on a range in which the corresponding predicted rate of change falls. For example, the performance analysis system 105 may identify a range in which the predicted rate of change falls, and then assign the severity level associated with the range. If the rate of change falls within a first range (e.g., less than 30%), then the performance analysis system 105 may assign a first severity level (e.g., "Normal"). If the rate of change falls within a second range (e.g., greater than or equal to 30% and less than 50%), then the performance analysis system 105 may assign a second severity level (e.g., "Severity 4"). If the rate of change falls within a third range (e.g., greater than or equal to 50% and less than 75%), then the performance analysis system 105 may assign a third severity level (e.g., "Severity 3"). If the rate of change falls within a fourth range (e.g., greater than or equal to 75% and less than 100%), then the performance analysis system 105 may assign a fourth severity level (e.g., "Severity 2"). If the rate of change falls within a fifth range (e.g., greater than or equal to 100%), then the performance analysis system 105 may assign a fifth severity level (e.g., "Severity 1").

Figure 1C:
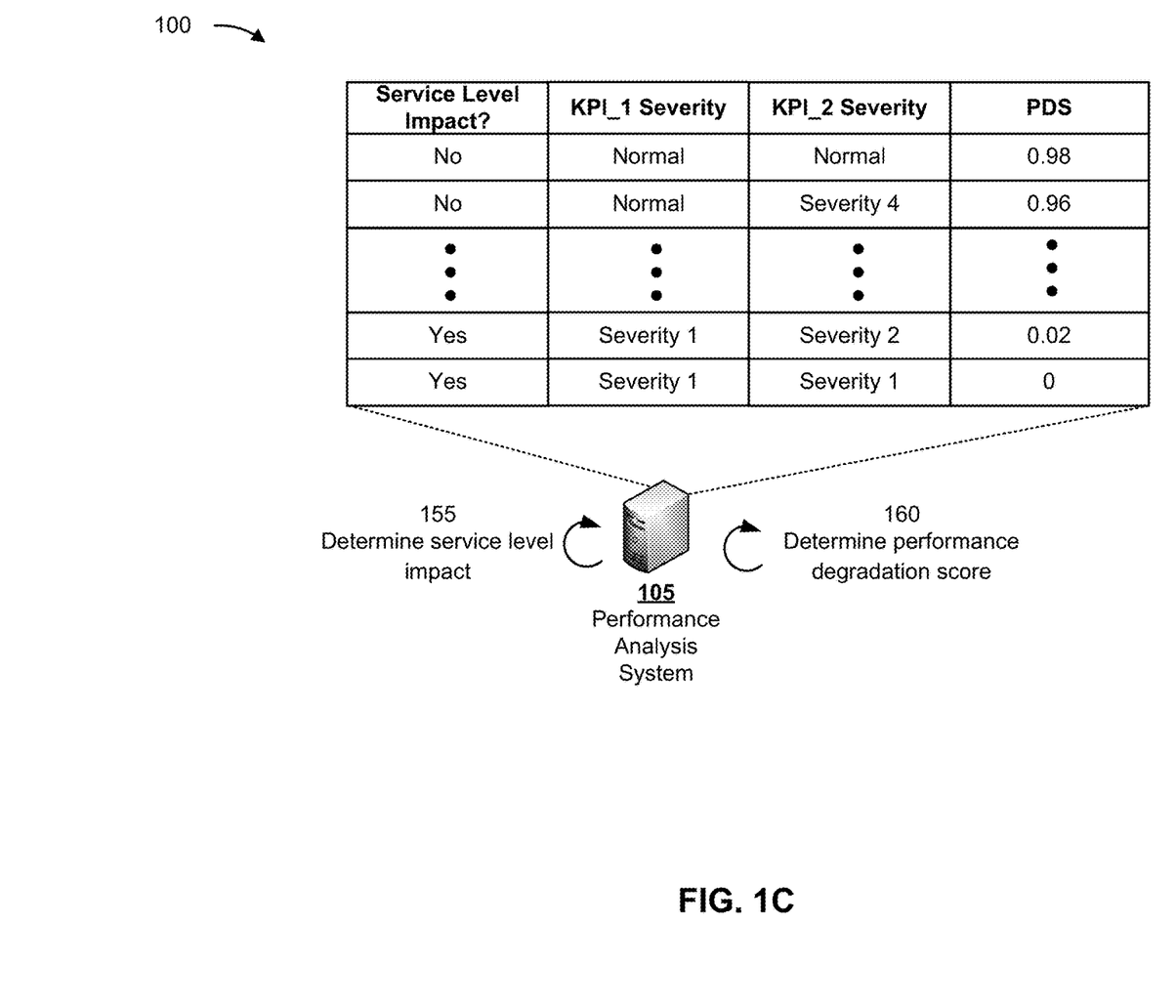

As shown in FIG. 1C, and by reference number 155, the performance analysis system 105 may determine a service level impact (e.g., whether or not there is a service level impact) based on the predicted values of the KPIs. For example, there may be a service level impact if the predicted values of one or more KPIs is greater than a corresponding target value. Additionally, or alternatively, if a service level value corresponding to the service level, which may be determined by adding together normalized values of other KPIs (e.g., the call-in-rate, the average speed of answer, and the abandon rate), is greater than a corresponding target value, the performance analysis system 105 may determine a service level impact.

As shown by reference number 160, the performance analysis system 105 may determine a performance degradation score based on a particular combination of the service level impact and the severity levels of the KPIs. For example, if two KPIs are used (e.g., average speed of answer and abandon rate), both having a lowest severity level (e.g., Normal"), and the performance analysis system 105 determined no service level impact, then the performance degradation score may be the highest score (e.g., 0.98) on a scale of multiple scores (e.g., 0-0.98). If both KPIs have a highest severity level (e.g., "Severity 1"), and the performance analysis system 105 determined that there is a service level impact, then the performance degradation score may be the lowest score (e.g., 0) on the scale. In some implementations, the performance analysis system 105 may identify the performance degradation score from a table in which the different combinations of service level impact and severity levels are associated with corresponding performance degradation score.

Figure 1D:
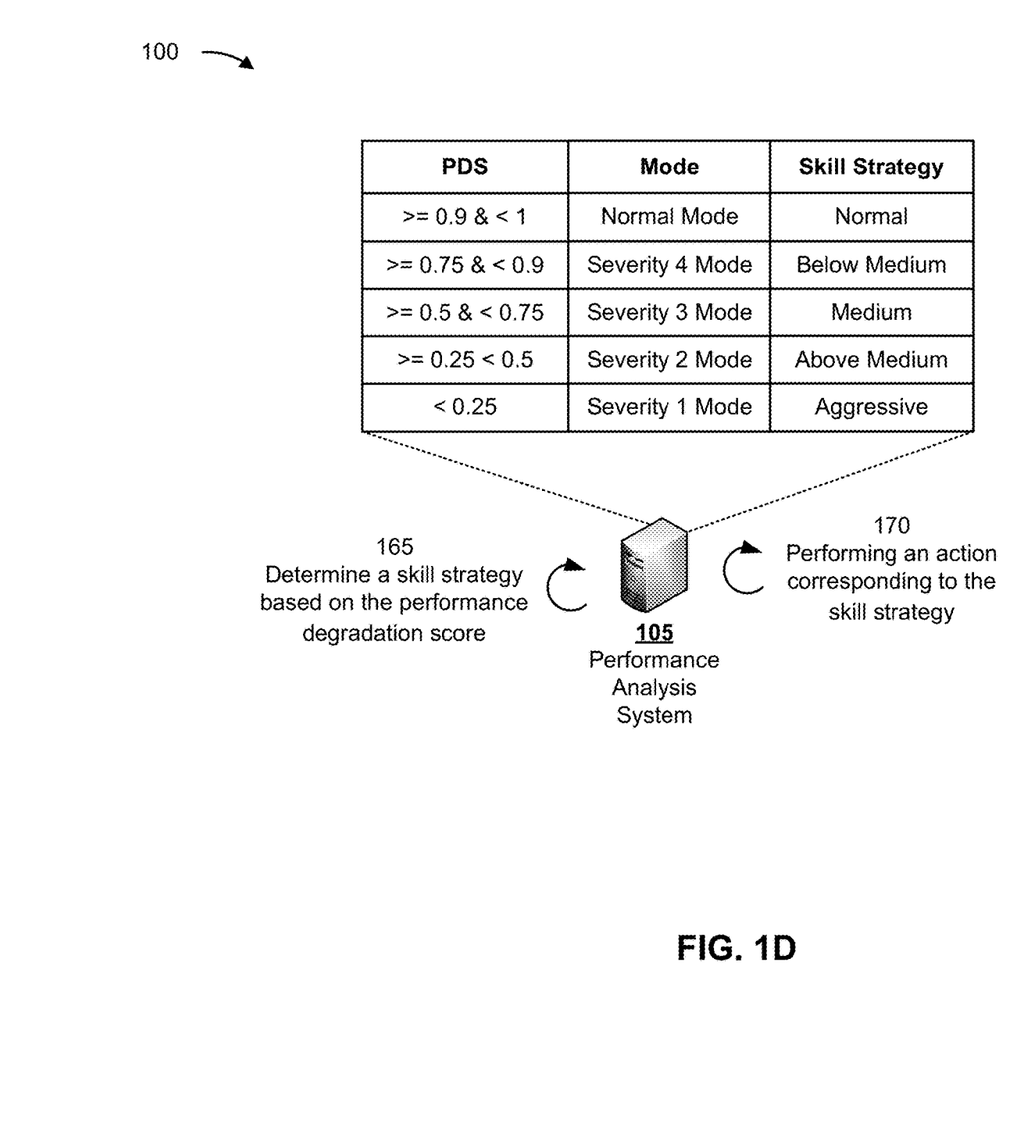

As shown in FIG. 1D, and by reference number 165, the performance analysis system 105 may determine, based on the performance degradation score, a strategy (also referred to as a skill strategy) for the contact center to proactively implement to maintain a target performance level of the contact center. In some implementations, the performance analysis system 105 may assign a mode to the particular performance degradation score. For example, the performance analysis system 105 may identify a performance degradation score range in which the performance degradation score falls, and may assign the mode corresponding to the identified performance degradation score range. The performance analysis system 105 may identify the strategy corresponding to the identified mode.

As shown by reference number 170, the performance analysis system 105 may perform an action associated with the strategy. For example, the strategy may be to apply changes to one or more configurations of one or more systems associated with the contact center (e.g., an interactive voice response (IVR) system, a routing system (pre and/or post routing), a queuing system, and/or an agent selection system). As an example, one change may be to enable or disable a callback offering. As another example, another change may be to enable or disable an agent opt-in option and/or banner messages (e.g., in the IVR system). Additionally, or alternatively, other exemplary strategies may be to dynamically change agent skills and/or modify routing strategies. In some implementations, the action may be to automatically apply the strategy (e.g., automatically change the configurations). Alternatively, the action may be to transmit the strategy to an agent or supervisor of the contact center to implement manually.

As described above, the performance analysis system 105 is able to use historical data associated with performance of a contact center to predict future performance of the contact center. To do so, the performance analysis system 105 may compare current values of particular KPIs with predicted values of the particular KPIs for a future timeframe to determine rates of change associated with the particular KPIs. Based on the rates of change, the performance analysis system 105 may assign severity levels corresponding to the KPIs, from which the performance analysis system 105 may determine a performance degradation score associated with the contact center. Based on the performance degradation score, the performance analysis system 105 may determine and apply a strategy for the contact center to implement. Accordingly, the performance analysis system 105 is able to proactively determine a strategy ahead of any potential performance degradation of the contact center to address the potential performance degradation before it happens. As a result, the contact center is able to efficiently operate and utilize contact center resources (e.g., computing and/or telephonic resources) and time to maximize the number of calls the contact center may handle.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D. Furthermore, the values shown in the tables in FIGS. 1A-1D are provided as an example. Additionally, in practice, the values may be adjustable (e.g., not static values).

Figure 2:
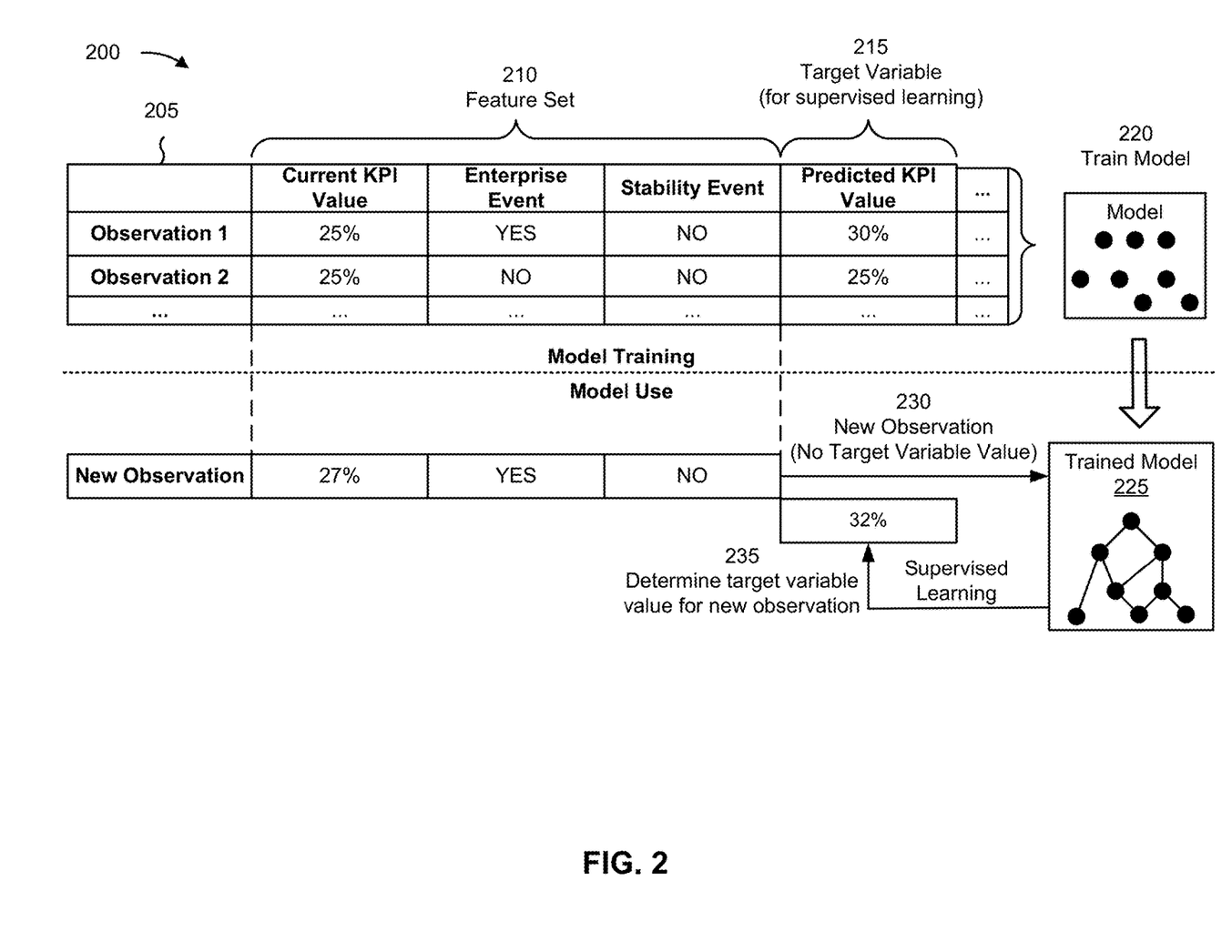
FIG. 2 is a diagram illustrating an example of training and using a machine learning model in connection with maintaining key performance indicator targets of a contact center.

FIG. 2 is a diagram illustrating an example 200 of training and using a machine learning model in connection with systems and methods for maintaining key performance indicator targets of a call center. The machine learning model training and usage described herein may be performed using a machine learning system. The machine learning system may include or may be included in a computing device, a server, a cloud computing environment, or the like, such as the performance analysis system 105 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the network storage device(s) 120, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the performance analysis system 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of current value of a particular KPI (e.g., average speed of answer or abandon rate), a second feature of an enterprise event, a third feature of a stability event, and so on. As shown, for a first observation, the first feature may have a value of 25%, the second feature may have a value of YES, the third feature may have a value of NO, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is predicted value of the particular KPI, which has a value of 30% for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As an example, the machine learning system may obtain training data for the set of observations based on historical data associated with one or more KPIs associated with multiple historical calls to the contact center. The performance analysis system 105 may provide, as inputs to the machine learning system, input data indicating current values corresponding to the performance associated with current calls to the contact center, one or more enterprise events, and one or more stability events associated with the contact center. The performance analysis system 105 may obtain the historical data from one or more network storage devices 120.

As shown by reference number 230, the machine learning system may apply the trained machine learning model 225 to a new observation, such as by receiving a new observation and inputting the new observation to the trained machine learning model 225. As shown, the new observation may include a first feature of current value of the particular KPI, which has a value of 27%, a second feature of an enterprise event, which has a value of YES, a third feature of a stability event, which has a value of NO, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed.

As an example, the trained machine learning model 225 may predict a value of 32% for the target variable of predicted value for the particular KPI for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a strategy for the contact center to apply, which may be determined from the predicted value as described above. The first automated action may include, for example, the strategy for the contact center.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include the current values corresponding to the KPIs when the future timeframe becomes the present timeframe (e.g., a comparison of the predicted values with the corresponding actual values).

In this way, the machine learning system may apply a rigorous and automated process to determine predicted values of KPIs, from which a strategy for the contact center may be proactively determined and applied. The machine learning system enables recognition and/or identification of tens, hundreds, thousands, or millions of features and/or feature values for tens, hundreds, thousands, or millions of observations, thereby increasing accuracy and consistency and reducing delay associated with determining predicted values of KPIs relative to requiring computing resources to be allocated for tens, hundreds, or thousands of operators to manually determine predicted values of KPIs using the features or feature values.

As indicated above, FIG. 2 is provided as an example. Other examples may differ from what is described in connection with FIG. 2.

Figure 3:
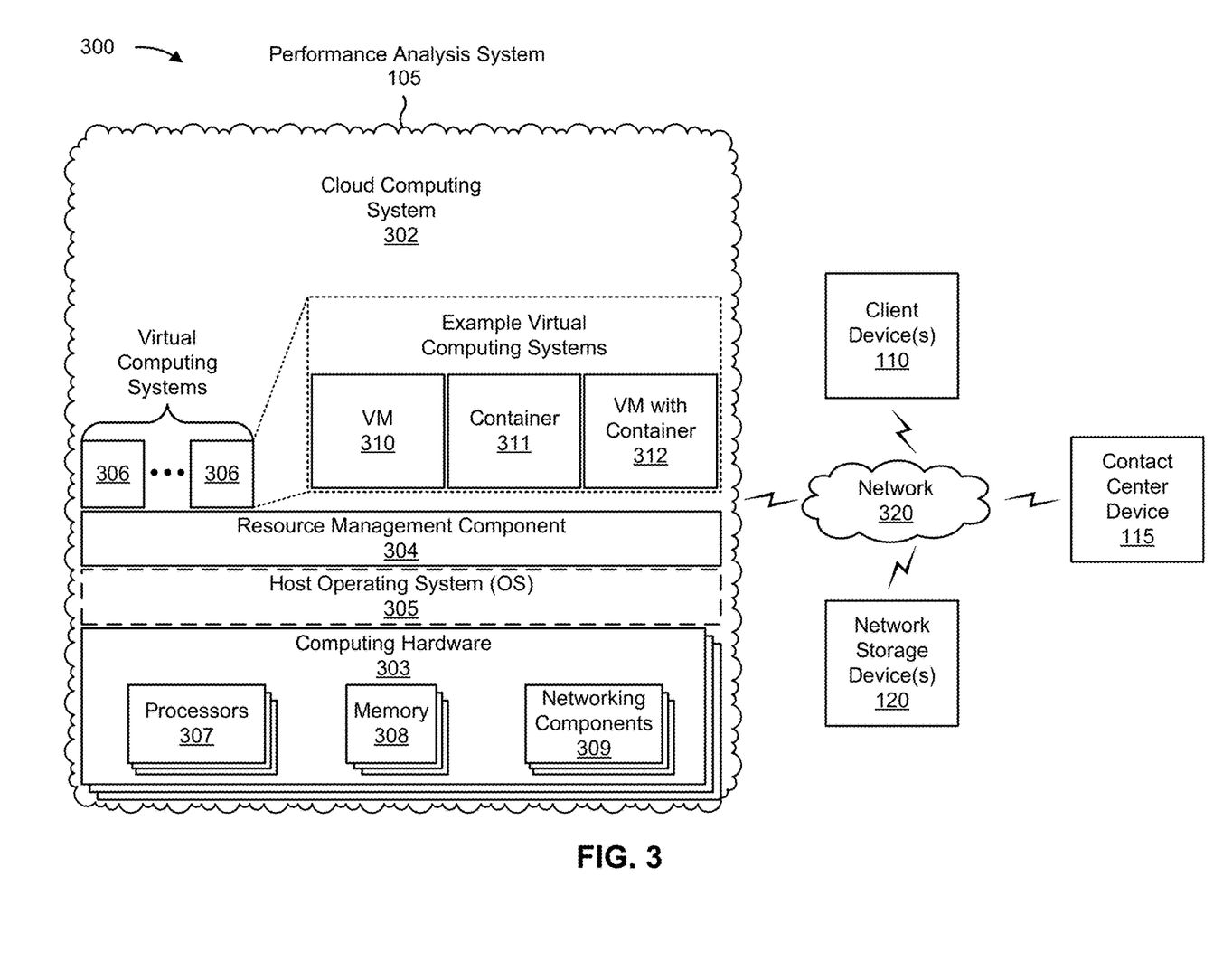
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a performance analysis system 105, which may include one or more elements of and/or may execute within a cloud computing system 302. The cloud computing system 302 may include one or more elements 303-312, as described in more detail below. As further shown in FIG. 3, environment 300 may include the client device(s) 110, the contact center device(s) 115, the network storage device(s) 120, and/or a network 320. Devices and/or elements of environment 300 may interconnect via wired connections and/or wireless connections.

The client device(s) 110 include one or more devices capable of receiving, generating, storing, processing, and/or providing information associated with maintaining key performance indicator targets of a contact center, and/or making a phone call (i.e., transmitting and receiving audio), as described elsewhere herein. The client device(s) 110 may include a communication device and/or a computing device. For example, the client device(s) 110 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The client device contact center device(s) include one or more devices capable of receiving, generating, storing, processing, and/or providing information associated with maintaining key performance indicator targets of a contact center, and/or making a phone call (i.e., transmitting and receiving audio), as described elsewhere herein. The client device contact center device(s) may include a communication device and/or a computing device. For example, the client device contact center device(s) may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network storage device(s) 120 includes one or more devices capable of receiving, generating, storing, processing, and/or providing information associated with maintaining key performance indicator targets of a contact center, as described elsewhere herein. The network storage device(s) 120 may include a communication device and/or a computing device. For example, the network storage device(s) 120 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the network storage device(s) 120 may store historical data associated with historical calls to the call center and/or contextual information (e.g., planned and/or unplanned enterprise events and/or stability events associated with the call center), as described elsewhere herein.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the performance analysis system 105 may include one or more elements 303-312 of the cloud computing system 302, may execute within the cloud computing system 302, and/or may be hosted within the cloud computing system 302, in some implementations, the performance analysis system 105 may not be cloud-based (e.g., may be implemented outside of a cloud computing system) or may be partially cloud-based. For example, the performance analysis system 105 may include one or more devices that are not part of the cloud computing system 302, such as device 300 of FIG. 3, which may include a standalone server or another type of computing device. The performance analysis system 105 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
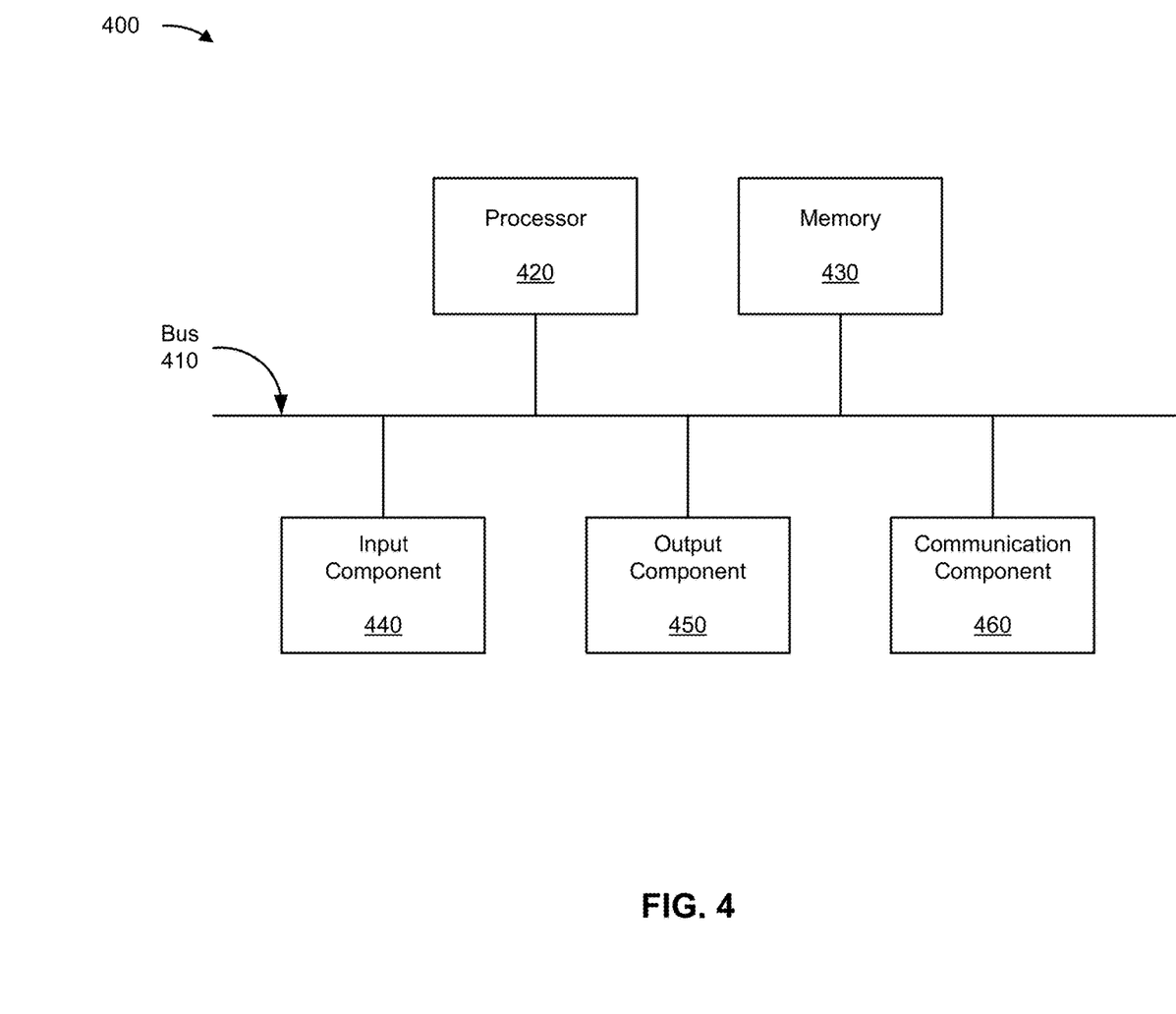
FIG. 4 is a diagram of example components of one or more devices of FIG. 3.

FIG. 4 is a diagram of example components of a device 400 associated with maintaining key performance indicator targets of a call center. Device 400 may correspond to performance analysis system 105, client device(s) 110, contact center device(s) 115, and/or network storage device(s) 120. In some implementations, performance analysis system 105, client device(s) 110, and/or network storage device(s) 120 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
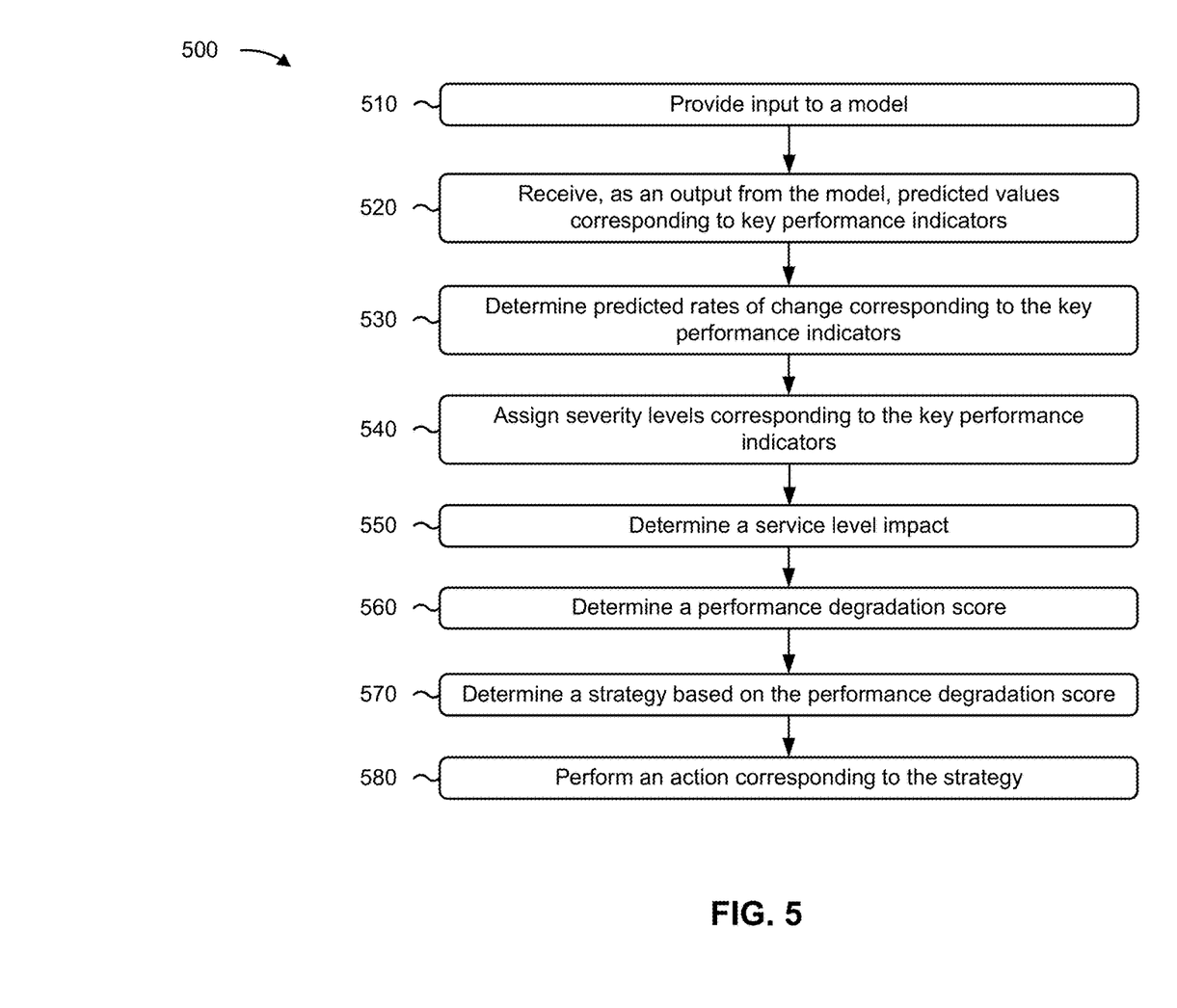
FIG. 5 is a flowchart of an example process associated with maintaining key performance indicator targets of a contact center.

FIG. 5 is a flowchart of an example process 500 associated with maintaining key performance indicator targets of a call center. In some implementations, one or more process blocks of FIG. 5 may be performed by a device (e.g., performance analysis system 105). In some implementations, one or more process blocks of FIG. 5 may be performed by another device (e.g., client device(s) 110 and/or contact center device(s) 115). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include providing input to a model (block 510). For example, the device may provide, as input to a model (e.g., a machine learning model), input data indicating: current values corresponding to key performance indicators associated with a plurality of current calls to a contact center, one or more enterprise events, and one or more stability events associated with the contact center, as described above. In some implementations, the model may be based on historical data associated with the key performance indicators associated with a plurality of historical calls to the contact center.

In some implementations, the key performance indicators may include one or more of: an abandon rate of a plurality of calls to the contact center, or an average speed of answering the plurality of calls to the contact center. In some implementations, the key performance indicators further may include one or more of a call-in-rate associated with the plurality of calls, a number of staffed agents associated with the contact center, or an average handling time associated with the plurality of calls. In some implementations, the one or more enterprise events may include planned events and unplanned events.

As further shown in FIG. 5, process 500 may include receiving, as an output from the model, predicted values corresponding to the key performance indicators for a future timeframe (block 520). For example, the device may receive, as an output from the model, predicted values corresponding to the key performance indicators for a future timeframe, as described above.

As further shown in FIG. 5, process 500 may include determining predicted rates of change corresponding to the key performance indicators (block 530). For example, the device may determine predicted rates of change corresponding to the key performance indicators based on a comparison of the current values and the predicted values of the key performance indicators, as described above.

As further shown in FIG. 5, process 500 may include assigning severity levels corresponding to the key performance indicators based on the predicted rates of change (block 540). For example, the device may assign severity levels corresponding to the key performance indicators based on the predicted rates of change, as described above.

In some implementations, assigning the severity levels comprises identifying, for a particular one of the key performance indicators, a range in which a particular predicted rate of change, of the predicted rates of change, falls, and assigning a particular severity level, of the severity levels, associated with the range, wherein the particular severity level corresponds to the particular one of the key performance indicators.

As further shown in FIG. 5, process 500 may include determining a service level impact (block 550). For example, the device may determine a service level impact based on the predicted values corresponding to the key performance indicators, as described above. In some implementations, determining the service level impact comprises determining that there is a service level impact if a service level value based on the predicted values, corresponding to the key performance indicators, is greater than a corresponding target value for the future timeframe As further shown in FIG. 5, process 500 may include determining a performance degradation score (block 560). For example, the device may determine a performance degradation score associated with the contact center based on the severity levels and the service level impact, as described above.

In some implementations, determining the performance degradation score comprises identifying, from a table of a plurality of performance degradation scores corresponding to a plurality of combinations of service level impact and severity levels for different key performance indicators, the performance degradation score, from the plurality of performance degradation scores, that corresponds to a combination of the severity levels and the service level impact.

As further shown in FIG. 5, process 500 may include determining a strategy based on the performance degradation score (block 570). For example, the device may determine a strategy based on the performance degradation score, as described above.

In some implementations, determining the strategy comprises assigning a mode, of a plurality of modes, to the performance degradation score, wherein the mode corresponds to a particular performance degradation score range, of a plurality of performance degradation score ranges, in which the performance degradation score falls, and identifying the strategy, from a plurality of strategies, that is associated with the particular performance degradation score range.

As further shown in FIG. 5, process 500 may include performing an action corresponding to the strategy (block 580). For example, the device may perform an action corresponding to the strategy, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
providing, by a device and as input to a trained machine learning model, input data indicating:

current values corresponding to key performance indicators associated with a plurality of current calls to a contact center,
one or more enterprise events, and
one or more stability events associated with the contact center;
receiving, by the device and as an output from the trained machine learning model, predicted values corresponding to the key performance indicators for a future timeframe;
determining, by the device, predicted rates of change corresponding to the key performance indicators based on a comparison of the current values and the predicted values corresponding to the key performance indicators;
assigning, by the device, severity levels corresponding to the key performance indicators based on the predicted rates of change;
determining, by the device, a service level impact based on the predicted values corresponding to the key performance indicators;
determining, by the device, a performance degradation score associated with the contact center based on the severity levels and the service level impact;
determining, by the device, a strategy based on the performance degradation score;
performing, by the device, an action corresponding to the strategy; and
re-training, by the device, the trained machine learning model based on using the action as an input to update the trained machine learning model.

2. The method of claim 1, wherein the key performance indicators include one or more of:
an abandon rate of a plurality of calls to the contact center, or
an average speed of answering the plurality of calls to the contact center.

3. The method of claim 2, wherein the key performance indicators further include one or more of:
a call-in-rate associated with the plurality of calls,
a number of staffed agents associated with the contact center, or
an average handling time associated with the plurality of calls.

4. The method of claim 1, wherein the one or more enterprise events include planned events and unplanned events.

5. The method of claim 1, wherein assigning the severity levels comprises:
identifying, for a particular one of the key performance indicators, a range in which a particular predicted rate of change, of the predicted rates of change, falls; and
assigning a particular severity level, of the severity levels, associated with the range,
wherein the particular severity level corresponds to the particular one of the key performance indicators.

6. The method of claim 1, wherein determining the service level impact comprises:
determining that there is a service level impact if a service level value based on the predicted values, corresponding to the key performance indicators, is greater than a target value for the future timeframe.

7. The method of claim 1, wherein determining the performance degradation score comprises:
identifying, from a table of a plurality of performance degradation scores corresponding to a plurality of combinations of the service level impact and severity levels for different key performance indicators, the performance degradation score, from the plurality of performance degradation scores, that corresponds to a combination of the severity levels and the service level impact.

8. The method of claim 1, wherein determining the strategy comprises:
assigning a mode, of a plurality of modes, to the performance degradation score,
wherein the mode corresponds to a particular performance degradation score range, of a plurality of performance degradation score ranges, in which the performance degradation score falls; and
identifying the strategy, from a plurality of strategies, that is associated with the particular performance degradation score range.

9. A device, comprising:
one or more processors configured to:
determine one or more current values corresponding to one or more key performance indicators associated with a plurality of current calls to a contact center;
determine, using a trained machine learning model, one or more predicted values corresponding to the one or more key performance indicators for a future timeframe, wherein the one or more predicted values are based on:
the one or more current values corresponding to the one or more key performance indicators,
one or more enterprise events, and
one or more stability events associated with the contact center;
determine one or more predicted rates of change of the one or more key performance indicators based on a comparison of the one or more current values and the one or more predicted values corresponding to the one or more key performance indicators;
assign one or more severity levels corresponding to the one or more key performance indicators based on the one or more predicted rates of change;
determine a service level impact based on the one or more predicted rates of change;
determine a performance degradation score associated with the contact center based on the one or more severity levels and the service level impact;
determine a strategy based on the performance degradation score;
apply the strategy; and
retrain the trained machine learning model by using the strategy as an input to update the trained machine learning model.

10. The device of claim 9, wherein the one or more key performance indicators includes one or more of:
an abandon rate of a plurality of calls, or
an average speed of answering the plurality of calls.

11. The device of claim 10, wherein the abandon rate and the average speed of answering one or more key performance indicators further include one or more of:
a call-in-rate associated with the plurality of calls,
a number of staffed agents associated with the contact center, or
an average handling time associated with the plurality of calls.

12. The device of claim 9, wherein the one or more enterprise events include planned events and unplanned events.

13. The device of claim 9, wherein the one or more processors, when assigning the one or more severity levels, are configured to:
   identify, for a particular one of the one or more key performance indicators, a range in which a particular predicted rate of change, of the one or more predicted rates of change, falls; and
   assign a particular severity level, of the one or more severity levels, associated with the range,
      wherein the particular severity level corresponds to the particular one of the one or more key performance indicators.

14. The device of claim 9, wherein the one or more processors, when determining the performance degradation score, are configured to:
   identify, from a table of a plurality of performance degradation scores corresponding to a plurality of combinations of service level impact and severity levels for different key performance indicators, the performance degradation score, from the plurality of performance degradation scores, that corresponds to a combination of the one or more severity levels and the service level impact.

15. The device of claim 9, wherein the one or more processors, when determining the strategy, are configured to:
   assign a mode, of a plurality of modes, to the performance degradation score,
      wherein the mode corresponds to a particular performance degradation score range, of a plurality of performance degradation score ranges, in which the performance degradation score falls; and
   identify the strategy, from a plurality of strategies, that is associated with the particular performance degradation score range.

16. A non-transitory computer-readable medium storing a set of instructions, the set of instructions comprising:
   one or more instructions that, when executed by one or more processors of a device, cause the device to:
      determine current values corresponding to a plurality of key performance indicators associated with a plurality of current calls to a contact center;
      determine, using a trained machine learning model, predicted values corresponding to the plurality of key performance indicators for a future timeframe, wherein the predicted values are based on:
         the current values corresponding to the plurality of key performance indicators,
         one or more enterprise events, and
         one or more stability events associated with the contact center;
      determine predicted rates of change of the one or more key performance indicators based on the current values and the predicted values corresponding to the plurality of key performance indicators;
      assign severity levels corresponding to the plurality of key performance indicators based on the predicted rates of change,
         wherein the severity levels are selected from a plurality of severity levels, and a particular severity level, of the plurality of severity levels, corresponds to a particular range of predicted rates of change;
      determine a service level impact based on the predicted values corresponding to the plurality of key performance indicators;
      determine a performance degradation score associated with the contact center based on a combination, of a plurality of combinations, of the severity levels and the service level impact,
         wherein a particular performance degradation score is associated with a particular combination, of the plurality of combinations, of the plurality of severity levels;
      identify a strategy associated with the performance degradation score; and
      retrain the trained machine learning model by using the strategy as an input to update the trained machine learning model.

17. The non-transitory computer-readable medium of claim 16, wherein the plurality of key performance indicators includes one or more of:
   an abandon rate of a plurality of calls, or
   an average speed of answering the plurality of calls.

18. The non-transitory computer-readable medium of claim 17, wherein the abandon rate and the average speed of answering the one or more key performance indicators further include one or more of:
   a call-in-rate associated with the plurality of calls,
   a number of staffed agents associated with the contact center, or
   an average handling time associated with the plurality of calls.

19. The non-transitory computer-readable medium of claim 16, wherein the one or more enterprise events include planned events and unplanned events.

20. The non-transitory computer-readable medium of claim 16, wherein the one or more instructions, that cause the device to determine predicted values corresponding to the plurality of key performance indicators for a future timeframe, cause the device to:
   input to the trained machine learning model, input data indicating:
      the current values corresponding to the plurality of key performance indicators associated with the plurality of current calls to the contact center,
      the one or more enterprise events, and
      the one or more stability events associated with the contact center,
         wherein the trained machine learning model is trained using historical data associated with the plurality of key performance indicators associated with a plurality of historical calls to the contact center.

* * * * *